Figure 1:
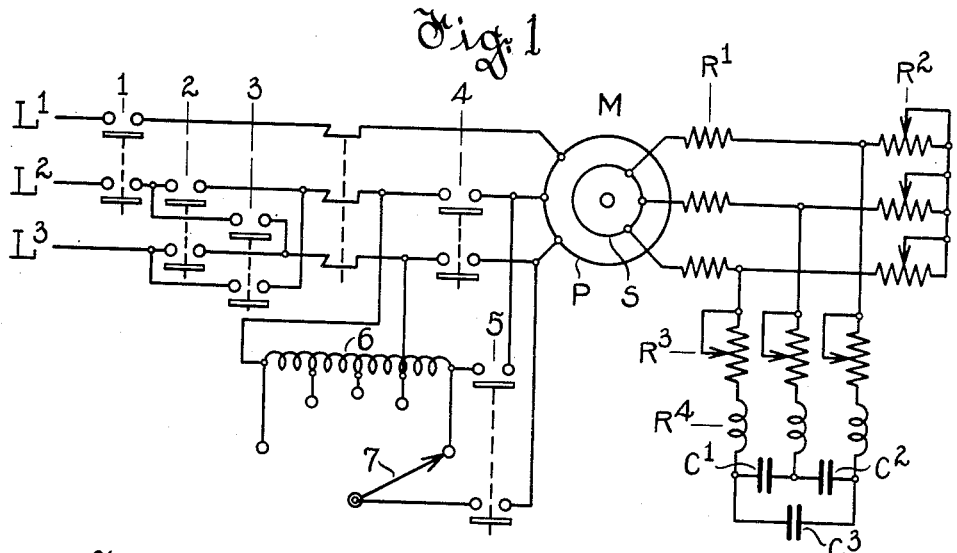

Aug. 15, 1950  E. PELL  2,519,196

CONTROL OF POLYPHASE SLIP RING INDUCTION MOTORS

Filed May 22, 1948

Inventor
Eric Pell
By Frank H. Hubbard
Attorney

Patented Aug. 15, 1950

2,519,196

UNITED STATES PATENT OFFICE 2,519,196

CONTROL OF POLYPHASE SLIP-RING INDUCTION MOTORS

Eric Pell, Shorewood, Wis., assignor to Cutler-Hammer, Inc., Milwaukee, Wis., a corporation of Delaware Application May 22, 1948, Serial No. 28,575

4 Claims. (Cl. 318—215)

This invention relates to control of polyphase slip ring induction motors.

More particularly the invention relates to control of such a motor having its secondary subjected to the influence of capacitive reactance and the invention involves both a new method and a new combination of means.

The control afforded by the present invention is not to be confused with that of single phasing the motor primary while subjecting the motor secondary to the influence of capacitive reactance, nor with such control supplemented by a condenser in the primary circuit, for neither affords the motor speed torque characteristics provided for by the present invention.

The present invention has among its objects to obtain new speed torque motor characteristics advantageous for a plurality of quadrants, particularly for the positive direction driving quadrant, the plugging quadrant and the dynamic or overhauling load quadrant.

Another object is to provide desirable speed torque characteristics for a plurality of quadrants at low speeds of the motor.

Another object is to provide for speed torque characteristics which according to adjustments provide for a quick slow down from full speed to a slow speed with little variation in speed for variation in load, or for a low stable speed with a high breakaway torque, or for restriction of a descending overhauling load to a slow speed throughout a wide torque range.

Other objects and advantages of the invention will hereinafter appear.

The accompanying drawing illustrates an embodiment of the invention which will now be described, such embodiment of the invention being susceptible of modifications hereinafter mentioned and to other modifications which will be apparent.

Figure 2:
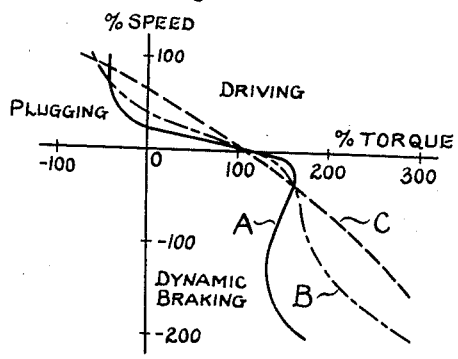
Figure 3:
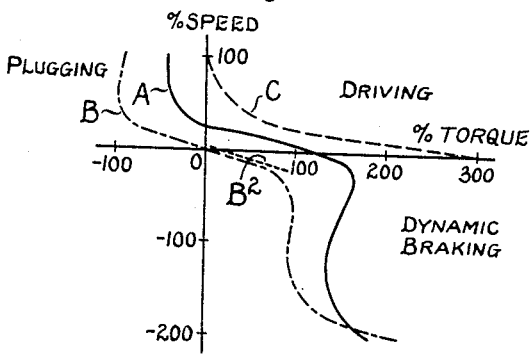
Figure 4:
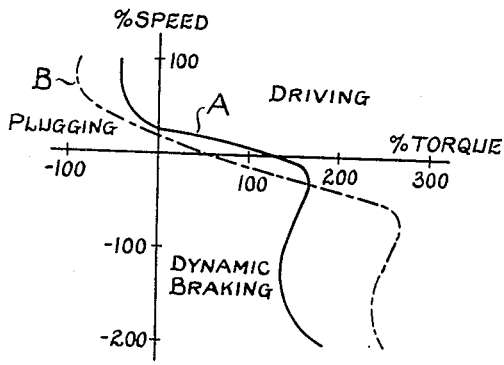

In the drawing,

Figure 1 shows schematically an induction motor with primary and secondary control means, both adjustable, and Figs. 2, 3 and 4 depict various representative speed torque curves obtainable through the medium of the control depicted.

Referring to Fig. 1, the same shows an induction motor M having a primary P and a secondary S. The motor primary P is connectable to lines $L^1$, $L^2$, $L^3$ of a three phase alternating current supply through a suitable double pole main switch 1 in conjunction with other switches, certain providing for reversal of phase rotation to afford motor torque in either direction according to requirements, and certain providing for polyphase line connections for the motor either inclusive or exclusive of voltage unbalancing means according to requirements. Double pole switches 2 and 3 closable selectively provide for reversals of phase rotation at will, while double pole switches 4 and 5 closable selectively provide for including in the motor connections or excluding therefrom at will the voltage unbalancing means shown as comprising a tapped autotransformer 6 with a tap adjusting arm 7. The autotransformer voltage unbalancing means is per se well known, being similar to that shown in the R. P. Anderson patent No. 2,436,413, February 24, 1948, said patent disclosing hoist control affording voltage balance for hoisting and voltage unbalance through the medium of the autotransformer for control of a descending overhauling load. In the instant application the voltage unbalance through the medium of the autotransformer is also utilized, as aforeindicated, for the positive driving quadrant, and the plugging quadrant, and it will be assumed that this is made possible by closure of switches 2 and 5, while alternative closure of switches 3 and 5 provides for voltage unbalance for the negative driving quadrant. The instant application lacks the connection of the Anderson control affording on the first lowering step a small torque in hoisting direction at zero speed. The connections controlled by the switches aforementioned appear too obvious to require description thereof, and as will be understood these switches may be operable either manually or through the medium of electromagnets or the like.

The motor secondary connections which per se are now known include fixed resistors $R^1$, adjustable resistors $R^2$, adjustable resistors $R^3$, reactors $R^4$ and capacitors $C^1$, $C^2$ and $C^3$. Each phase of the secondary circuit includes in series relation one of the resistors $R^1$, one of the resistors $R^3$, and one of the reactors $R^4$, the reactors being terminally connected at different selected points to a loop containing the capacitors $C^1$, $C^2$ and $C^3$ whereby the capacitors are connected across different phases of the motor secondary. The adjustable resistors $R^2$ have their outer terminals interconnected, whereas said resistors have their opposite terminals connected to different phases of the motor secondary circuit, each at a common point of one set of resistors $R^1$ and $R^3$. The resistors $R^2$ are commonly referred to and are herein referred to as the parallel resistors.

In practice the secondary connections aforedescribed are preferred for flexibility of control but they are subject to modification. Thus for example where resistance adjustment is not necessary the resistors $R^2$ and $R^3$, or either, may be omitted. On the other hand, it is possible to dispense with the resistors $R^1$, retaining resistors $R^2$ and $R^3$. These modifications as well as the preferred connections are per se now known, as are also the effects, generally considered, of all such connections.

However, both subjecting the motor secondary to the influence of capacitive reactance and subjecting the motor primary to the polyphase voltage of the supply source with such voltage unbalanced, not only appears novel but renders obtainable motor characteristics which are highly advantageous and which have been sought heretofore without success. Also as will appear, such advantageous characteristics are obtainable for different quadrants, thus affording the novel control a wide field of utility. Such characteristics are depicted in Figs. 2, 3 and 4 to which reference will now be made.

Fig. 2 depicts motor characteristics obtained through adjustment of the parallel resistance (resistors $R^2$), the tuning of the motor secondary circuit and the voltage unbalance of the motor primary both being fixed. Curve A depicts the speed-torque characteristic of the motor, with infinite parallel resistance, whereas the characteristic at zero value of the parallel resistance is depicted by curve C, and at an intermediate value of said resistance is depicted by curve B. The characteristic depicted by curve A is especially advantageous in control of a draw bench, for with such characteristic the motor through dynamic braking or plugging will quickly slow down from full speed to a suitable slow threading speed, which because of the slope of the speed torque curve in this region will give but little variation in speed for variation in load. Also the characteristic depicted by curve A is very advantageous in printing press control in that it provides for a stable low speed and a high breakaway torque. As will be apparent, the light load speed may be increased with little change in breakaway torque, by reducing the parallel resistance.

Fig. 3 depicts motor characteristics obtained through varying the voltage unbalance of the motor primary, the parallel resistance and the tuning of the motor secondary circuit both being fixed. Curve A depicts the speed torque characteristic of the motor with infinite parallel resistance and an intermediate degree of primary voltage unbalance, whereas curve B depicts the characteristic with maximum unbalance and curve C with zero unbalance. Thus varying the degree of unbalance results in a shift in speed-torque characteristic essentially parallel to itself and the speed-torque characteristic here depicted is very advantageous in hoist control in that it provides for selection of stable operating speeds in hoisting at light loads or an empty hook or in lowering overhauling loads. Curve $B^2$ represents the first speed point lowering of a well known A. C. dynamic lowering hoist controller using the slightly different connections of said Anderson patent.

Fig. 4 depicts the speed-torque characteristics obtained through variation in tuning of the motor secondary circuit, the parallel resistance and the degree of primary voltage unbalance being fixed. Curve A depicts the speed torque characteristic with infinite parallel resistance and with resonance at 115% slip, while curve B depicts the characteristic at 170% slip. Thus here again, as also exemplified in Figs. 2 and 3, the motor speed-torque characteristics are particularly useful where stable low speeds are required.

What I claim as new and desire to secure by Letters Patent is:

1. The method of controlling a polyphase induction motor of the slip ring type to obtain desired speed torque characteristics, which comprises subjecting the motor secondary to the combined influence of capacitive and inductive reactance while at the same time supplying to the motor primary polyphase alternating current from a polyphase supply source in such manner as to effect voltage unbalance of the motor primary in utilizing the polyphase voltage of the supply source.

2. The method of controlling a polyphase induction motor of the slip ring type which comprises subjecting the motor secondary to the combined influence of capacitive and inductive reactance while supplying the motor primary with polyphase current from a polyphase source through means to unbalance the polyphase voltage to which the motor primary is subjected by said source and regulating the influence of the capacitive and inductive reactance and the degree of voltage unbalance for motor speed torque characteristics which according to such regulation provide for a quick slowdown from full speed to a slow speed with little variation in speed for variation in load or a low stable speed with a high breakaway torque or restriction of a descending overhauling load to a slow speed throughout a wide torque range.

3. The combination with a polyphase induction motor of the slip ring type, of a polyphase supply source therefor, a circuit for the secondary of said motor comprising capacitive and inductive reactance and polyphase connections between the motor primary and said source comprising means providing for voltage unbalance of the polyphase current supply to said motor primary.

4. The combination with a polyphase induction motor of the slip ring type, of a polyphase supply source therefor, a circuit for the secondary of said motor comprising capacitive and inductive reactance and also adjustable parallel resistance, and polyphase connections between the motor primary and said source comprising adjustable means providing a wide range of voltage unbalance of the polyphase current supply to said motor.

ERIC PELL.

REFERENCES CITED

The following references are of record in the file of this patent:

UNITED STATES PATENTS

| Number | Name | Date |
| --- | --- | --- |
| 1,598,192 | Seymour et al. | Aug. 31, 1926 |
| 1,759,551 | Greenleaf et al. | May 20, 1930 |
| 1,866,349 | Green | July 5, 1932 |
| 2,420,192 | Rathbun | May 6, 1947 |

FOREIGN PATENTS

| Number | Country | Date |
| --- | --- | --- |
| 212,698 | Switzerland | Mar. 3, 1936 |
| 634,825 | Germany | Sept. 4, 1936 |

OTHER REFERENCES

"An A-C Crane Hoist with Reactor Control" by Wickerham et al., Westinghouse Engineer for May 1945, pp. 77-81.